(12) United States Patent
Sora

(10) Patent No.: US 8,205,719 B2
(45) Date of Patent: Jun. 26, 2012

(54) HYBRID WORKING MACHINE

(75) Inventor: Toshio Sora, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 166 days.

(21) Appl. No.: 12/685,976

(22) Filed: Jan. 12, 2010

(65) Prior Publication Data

US 2010/0193296 A1  Aug. 5, 2010

(30) Foreign Application Priority Data

Feb. 3, 2009  (JP) .................................. 2009-022833

(51) Int. Cl.
*F01M 11/00* (2006.01)
*F16N 9/02* (2006.01)
*F16N 1/00* (2006.01)

(52) U.S. Cl. .......................................................... 184/14

(58) Field of Classification Search .................. 184/14, 184/6.12; 56/12.3; 475/160; 310/67 R, 310/113, 75 D; 74/606 A
See application file for complete search history.

(56) References Cited

U.S. PATENT DOCUMENTS

| 2,655,014 | A | * | 10/1953 | Walker | 464/16 |
| 4,157,020 | A | * | 6/1979 | Young | 464/16 |
| 5,624,344 | A | * | 4/1997 | Yehl et al. | 475/160 |
| 5,669,844 | A | * | 9/1997 | Homan et al. | 475/160 |
| 5,885,181 | A | * | 3/1999 | Dissett | 475/160 |
| 6,666,022 | B1 | | 12/2003 | Yoshimatsu et al. | |
| 2008/0149423 | A1 | * | 6/2008 | Jankuski | 184/6.5 |
| 2009/0000871 | A1 | * | 1/2009 | McClave et al. | 184/6.5 |
| 2011/0001400 | A1 | * | 1/2011 | Chiba et al. | 310/67 R |

FOREIGN PATENT DOCUMENTS

| EP | 1885046 A1 | * | 2/2008 |
| JP | 2001-12274 | | 1/2001 |
| WO | WO-2009034781 A1 | * | 3/2009 |

* cited by examiner

*Primary Examiner* — Michael Mansen
*Assistant Examiner* — Minh Truong
(74) *Attorney, Agent, or Firm* — Oblon, Spivak, McClelland, Maier & Neustadt, L.L.P.

(57) ABSTRACT

As lubricating construction for a spline coupling portion for connecting a rotating shaft of a generator-motor and a rotating shaft of a hydraulic pump both actuated by an engine, a lubricating oil chamber communicating with the spline coupling portion is formed within a motor casing of the generator-motor, while in a pump casing of the hydraulic pump there is formed an oil passing hole providing communication between the lubricating oil chamber and an oil chamber in the hydraulic pump on an outer periphery side of the rotating shaft of the hydraulic pump, thereby forming an oil passage for allowing working oil present within the hydraulic pump to circulate through a route including the spline coupling portion.

2 Claims, 2 Drawing Sheets

HYBRID WORKING MACHINE

BACKGROUND OF THE INVENTION

1. Field of the Invention

The present invention relates to a hybrid working machine wherein a rotating shaft of a generator-motor and that of a hydraulic pump are coupled directly by spline coupling.

2. Description of the Related Art

A background technique will be described below with reference to an excavator as an example.

FIG. 3 shows a configuration example of a hybrid excavator.

A generator-motor 1 adapted to perform both generator function and motor function and a hydraulic pump 2 serving as an oil pressure source of hydraulic actuators are connected in tandem to an engine 3 and pressure oil from the hydraulic pump 2 is supplied to plural hydraulic actuators through a control valve 4.

On the other hand, a battery (an electric power storage device) 6 is charged through an inverter 5 by the generator function of the generator-motor 1 and at the same time, with the electric power stored in the battery 6, the generator-motor 1 performs the motor function to assist the engine 3 (see Japanese Patent Laid-Open No. 2001-12274).

A rotating shaft of the generator-motor 1 and that of the hydraulic pump 2 are coupled directly by spline coupling and rotate integrally with each other by operation of the engine.

In the direct coupling structure by spline coupling it is known that there occurs fretting wear (wear caused by striking of spline teeth against each other under fine vibration) by revolution fluctuation.

Particularly in the spline coupling structure between the generator-motor 1 and the hydraulic pump 2, fretting wear is apt to occur because there is torque fluctuation in generator function/motor function of the generator-motor 1 in addition to the revolution fluctuation of the engine 3.

A method conceivable as a countermeasure to the fretting wear is to fix the spline coupling portion so as to prevent vibration. However, this fixing method is not suitable for practical use because not only the assembling performance is deteriorated but also a difficulty is encountered in ensuring a required space and the cost becomes high.

On the other hand, it is known that the fretting wear can be suppressed by lubricating the spline coupling portion with oil.

In this connection, the following methods are considered as concrete methods.

(I) An external oiling method wherein an oiling hole communicating with the spline coupling portion is formed in a casing of the generator-motor 1 and, where required, lubricating oil is fed through the oiling hole to the spline coupling portion from the exterior.

(II) An oil sealing method wherein an oil chamber communicating with the spline coupling portion is formed in the casing and lubricating oil is sealed into the oil chamber to immerse the spline coupling portion within the lubricating oil.

However, the external oiling method requires maintenance and there easily occurs deficient lubrication due to forgetting to supply oil or oil shortage. Thus, the reliability of wear prevention is low.

Further, in the oil sealing method, not only the oil sealing work after assembly is troublesome, but also there is a fear of deficient lubrication due to deterioration or change in quality of oil.

SUMMARY OF THE INVENTION

It is an object of the present invention to provide a hybrid working machine equipped with a shaft lubricating device not requiring such maintenance as in the external oiling method, free of such troublesomeness of the sealing work and fear of deterioration or change in quality of oil as in the sealing method and high in reliability of preventing wear in a spline coupling portion.

In the hybrid working machine of the present invention, a rotating shaft of a generator-motor and that of a hydraulic pump both actuated by an engine are coupled directly by spline coupling, and the hybrid working machine is equipped with a shaft lubricating device for lubricating a spline coupling portion formed by the above spline coupling. In the shaft lubricating device, an oil passage for allowing working oil present within the hydraulic pump to circulate through a route including the above spline coupling portion is formed within a casing which covers the spline coupling portion.

Taking note of the point that the interior of the hydraulic pump as one constituent member of spline coupling is filled with working oil, the present invention adopts a construction wherein the working oil present within the hydraulic pump is circulated through a route including the spline coupling portion so as to lubricate the spline coupling portion. According to this construction there is no need for such maintenance as in the external oiling method nor such troublesomeness of the oil sealing work and fear of deterioration or change in quality of oil as in the sealing method.

That is, fresh and a sufficient amount of lubricating oil can be supplied constantly and automatically to the spline coupling portion, whereby fretting wear can be prevented positively.

In connection with the above construction, moreover, it is preferable to adopt a construction wherein a lubricating oil chamber communicating with the spline coupling portion is formed within a motor casing of the generator-motor which casing covers the spline coupling portion, while in a pump casing of the hydraulic pump there is formed an oil passing hole which provides communication between the lubricating oil chamber in the generator-motor and an oil chamber in the hydraulic pump on an outer periphery side of the rotating shaft of the hydraulic pump, thereby forming the oil passage.

Also in this case there is obtained the effect of the present invention. The route including the spline coupling portion corresponds to the oil passage in the above preferred example and the oil passage is defined by the lubricating oil chamber in the generator-motor and the oil passing hole.

DESCRIPTION OF THE PREFERRED EMBODIMENTS

Figure 1:
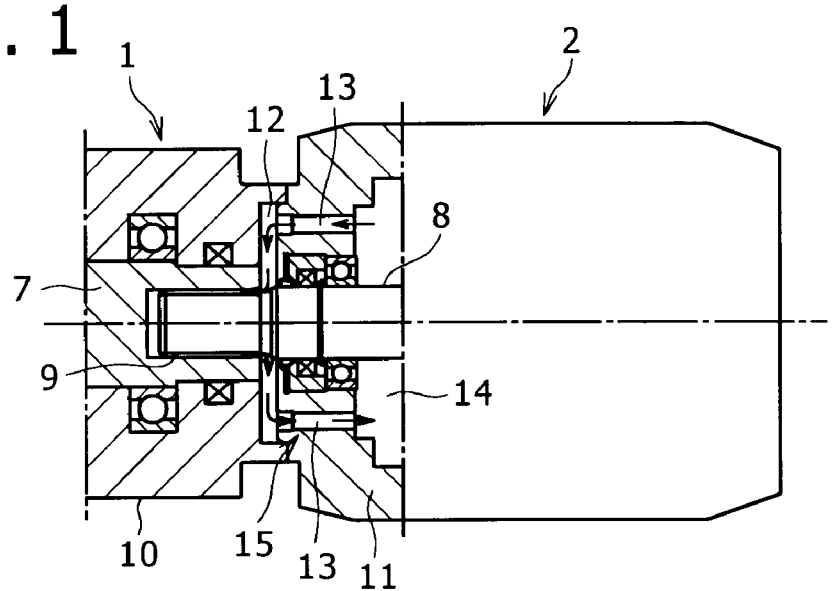
FIG. 1 is a sectional view of a spline coupling portion between a generator-motor and a hydraulic pump according to an embodiment of the present invention.

An embodiment of the present invention will be described below with reference to FIGS. 1 and 2.

A rotating shaft 7 of a generator-motor 1 and a rotating shaft (input shaft) 8 of a hydraulic pump 2 are coupled directly by spline coupling (the numeral 9 denotes a spline coupling portion) and a rotational force of an engine is transmitted from the generator-motor 1 to the hydraulic pump 2 via the spline coupling portion 9.

Numeral 10 denotes a casing (hereinafter referred to as the "motor casing") of the generator-motor 1 and numeral 11 denotes a casing (hereinafter referred to as the "pump casing") of the hydraulic pump 2. In the illustrated embodiment, both rotating shafts 7 and 8 are coupled together by spline coupling within the motor casing 10.

On a pump-side end portion of the motor casing 10 is formed a lubricating oil chamber 12 so as to communicate with the spline coupling portion 9.

The lubricating oil chamber 12 is formed on a pump-side end face of the motor casing 10 as a concave portion which opens to the pump side. The pump-side opening is closed upon coupling of both casings 10 and 11 to form the chamber in question.

On the other hand, through an end face of the pump casing 11 opposed to the motor casing 10 there are formed a plurality of oil passing holes 13 (only two are shown in the drawing) in parallel with the rotating shafts 7, 8 and so as to provide communication between the lubricating oil chamber 12 and an oil chamber (designated a pump oil chamber) 14 on an outer periphery side of the rotating shaft 8, the pump oil chamber 14 being originally formed within the pump casing 11.

In this way there is formed an oil passage 15 which provides communication between the pump oil chamber 14 and the lubricating oil chamber 12 with use of the oil passing holes 13.

Working oil present within the hydraulic pump 2 (the pump oil chamber 14) circulates through the oil passage 15 and along a route including the spline coupling portion 9.

More specifically, during rotation of the hydraulic pump 2, a portion of the working oil which is present in the pump oil chamber 14 to operate hydraulic actuators flows through the oil passing holes 13 into the lubricating oil chamber 12 and also gets into the spline coupling portion 9 to lubricate the spline coupling portion 9 in an immersed state of the same portion into oil.

Fretting wear of the spline coupling portion 9 is prevented by the above lubricating action.

Figure 2:
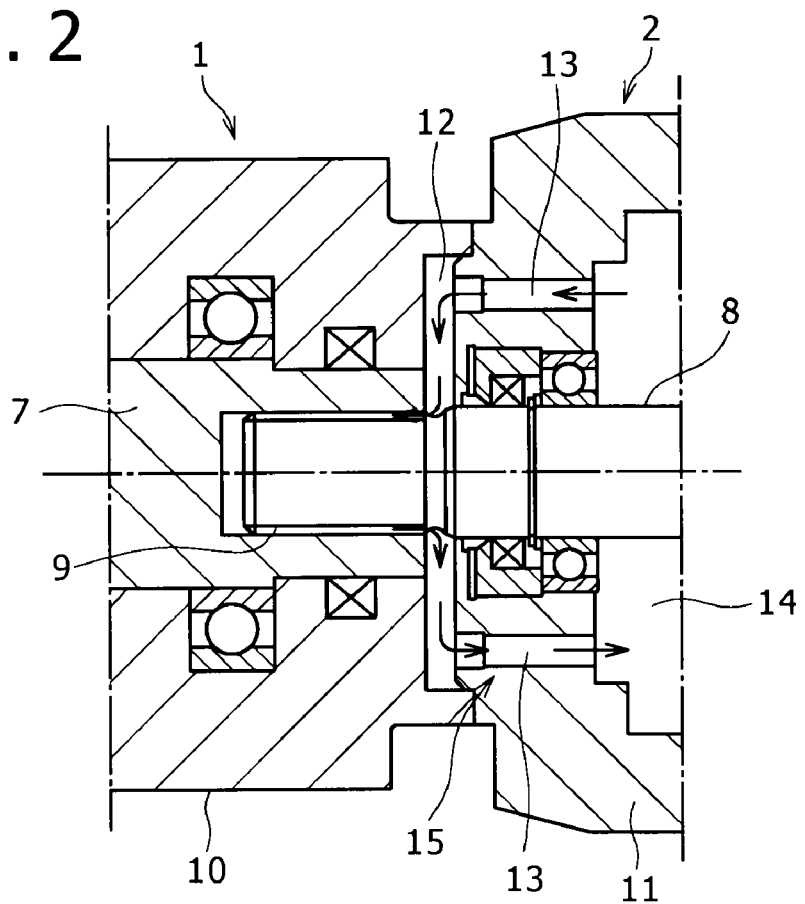
FIG. 2 is a partial enlarged view of FIG. 1.
Figure 3:
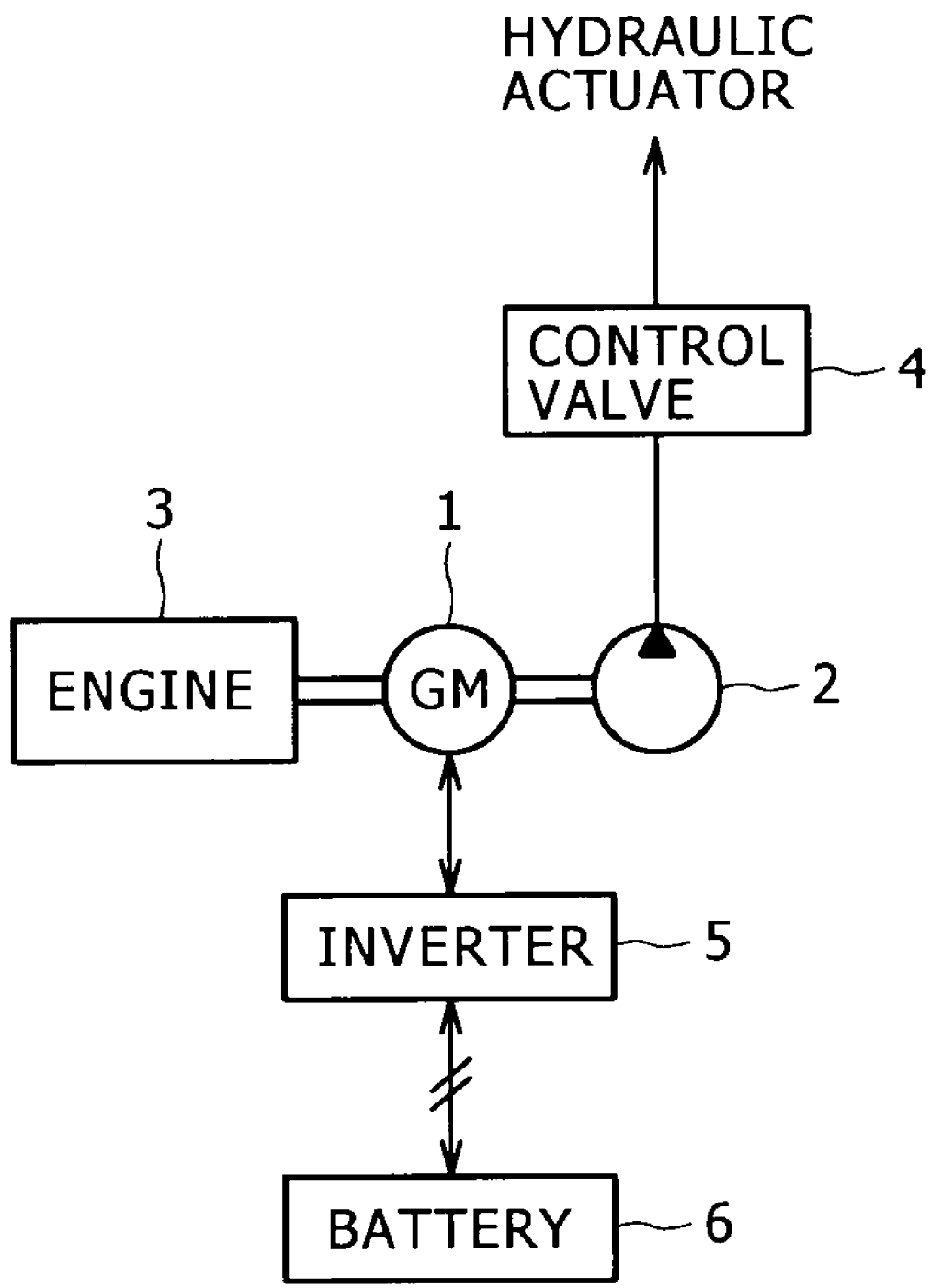
FIG. 3 is a block diagram of a hybrid excavator.

By virtue of the internal pressure of the pump oil chamber 14, a centrifugal force induced with rotation of both rotating shafts 7, 8 and of the spline coupling portion 9, and a pump action of the spline coupling portion 9, the working oil present within the pump oil chamber 14 circulates through the oil passage 15 automatically and constantly while being replaced by fresh working oil present in the pump oil chamber 14, as shown by arrows in FIG. 2.

Thus, according to the construction being considered, the working oil present in the hydraulic pump 2 as one constituent member of the spline coupling is circulated through the oil passage 15 including the spline coupling portion 9. Consequently, the spline coupling portion 9 is lubricated to prevent fretting wear. Therefore, such maintenance as in the external oiling method is not required at all, nor are there such troublesomeness of the oil sealing work and fear of deterioration of oil or change in quality of oil as in the oil sealing method.

That is, fresh and a sufficient amount of lubricating oil is supplied to the spline coupling portion 9 constantly and automatically, whereby fretting wear of the spline coupling portion 9 between the generator-motor 1 and the hydraulic pump 2 which portion undergoes marked revolution fluctuation and torque fluctuation can be prevented positively.

OTHER EMBODIMENTS (1) Although the above embodiment dealt with the case where both rotating shafts 7 and 8 are coupled by spline coupling within the motor casing 10, the present invention is also applicable to the case where both rotating shafts 7 and 8 are coupled by spline coupling within the pump casing 11.

In this case there may be adopted a construction wherein the lubricating oil chamber 12 is formed within the pump casing 11 and both lubricating oil chamber 12 and pump oil chamber 14 are brought into communication with each other through the oil passing holes 13 within the pump casing 11.

(2) Although in the above embodiment the lubricating oil chamber 12 and the pump oil chamber 14 are brought into communication with each other through the oil passing holes 13 to constitute the oil passage 15, there may be adopted a construction wherein the pump oil chamber 14 and the spline coupling portion 9 are brought into communication with each other directly through oil passing holes.

(3) The present invention is applicable not only to the excavator but also widely to hybrid working machines each equipped with a generator-motor and a hydraulic pump.

Although the invention has been described with reference to the preferred embodiments in the attached figures, it is noted that equivalents may be employed and substitutions made herein without departing from the scope of the invention as recited in the claims.

I claim:

1. A hybrid working machine comprising:
    a generator-motor adapted to be operated by an engine;
    a hydraulic pump having a rotating shaft coupled directly to a rotating shaft of said generator-motor by spline coupling; and
    a shaft lubricating device for lubricating a spline coupling portion coupled by said spline coupling,
    wherein said shaft lubricating device comprises an oil passage allowing working oil present within said hydraulic pump to circulate through a route including said spline coupling portion, said oil passage being formed within a casing for covering said spline coupling portion, said oil passage comprising:
        a lubricating oil chamber formed within a motor casing of said motor-generator, said lubricating oil chamber communicating with said spline coupling portion,
        an oil chamber in a pump casing of said hydraulic pump, said oil chamber of said hydraulic pump extending radially outward of the outer periphery of said rotating shaft of said hydraulic pump, and
        an oil passing hole formed in the pump casing of said hydraulic pump, the oil passing hole communicating between said lubricating oil chamber formed within the motor casing of said motor-generator and said oil chamber of said hydraulic pump, the oil passing hole extending along a portion radially external of the outer periphery of said rotating shaft of said hydraulic pump.

2. The hybrid working machine according to claim 1, wherein said oil passing hole extends along an axial direction of said rotating shaft.

* * * * *